June 13, 1933.  J. R. PEIRCE  1,914,285
ACCOUNTING MACHINE
Filed Feb. 7, 1930   11 Sheets-Sheet 6

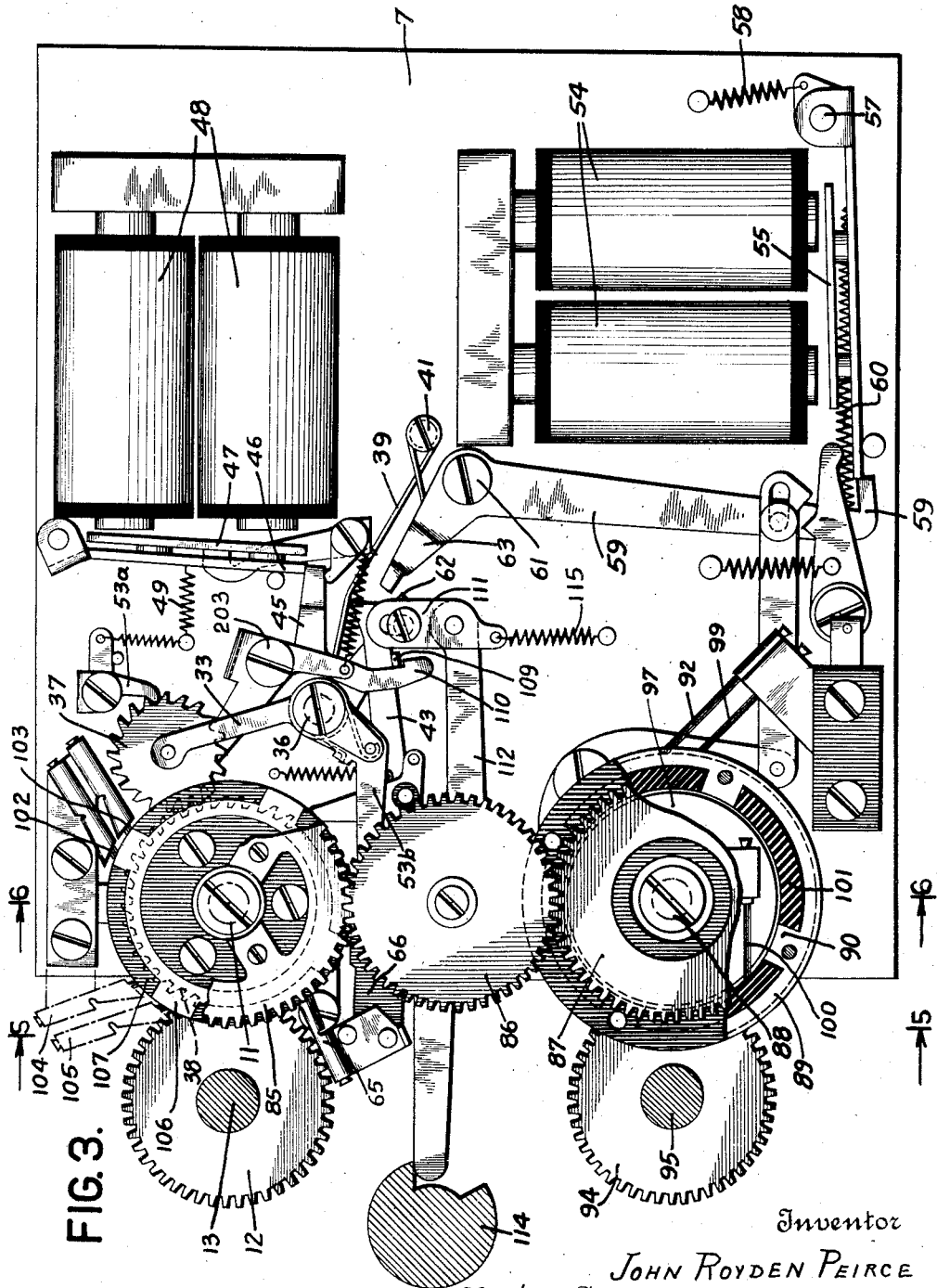

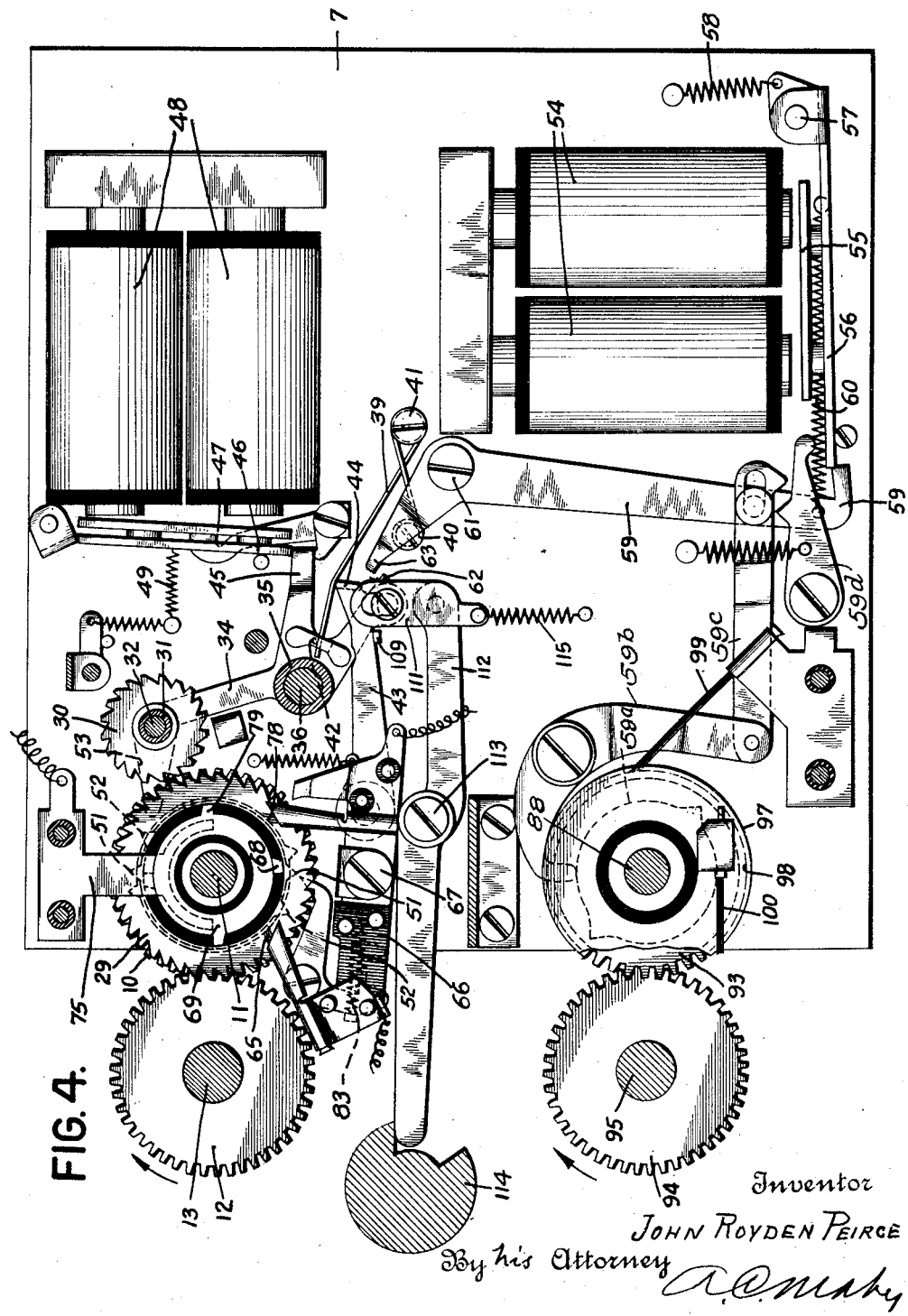

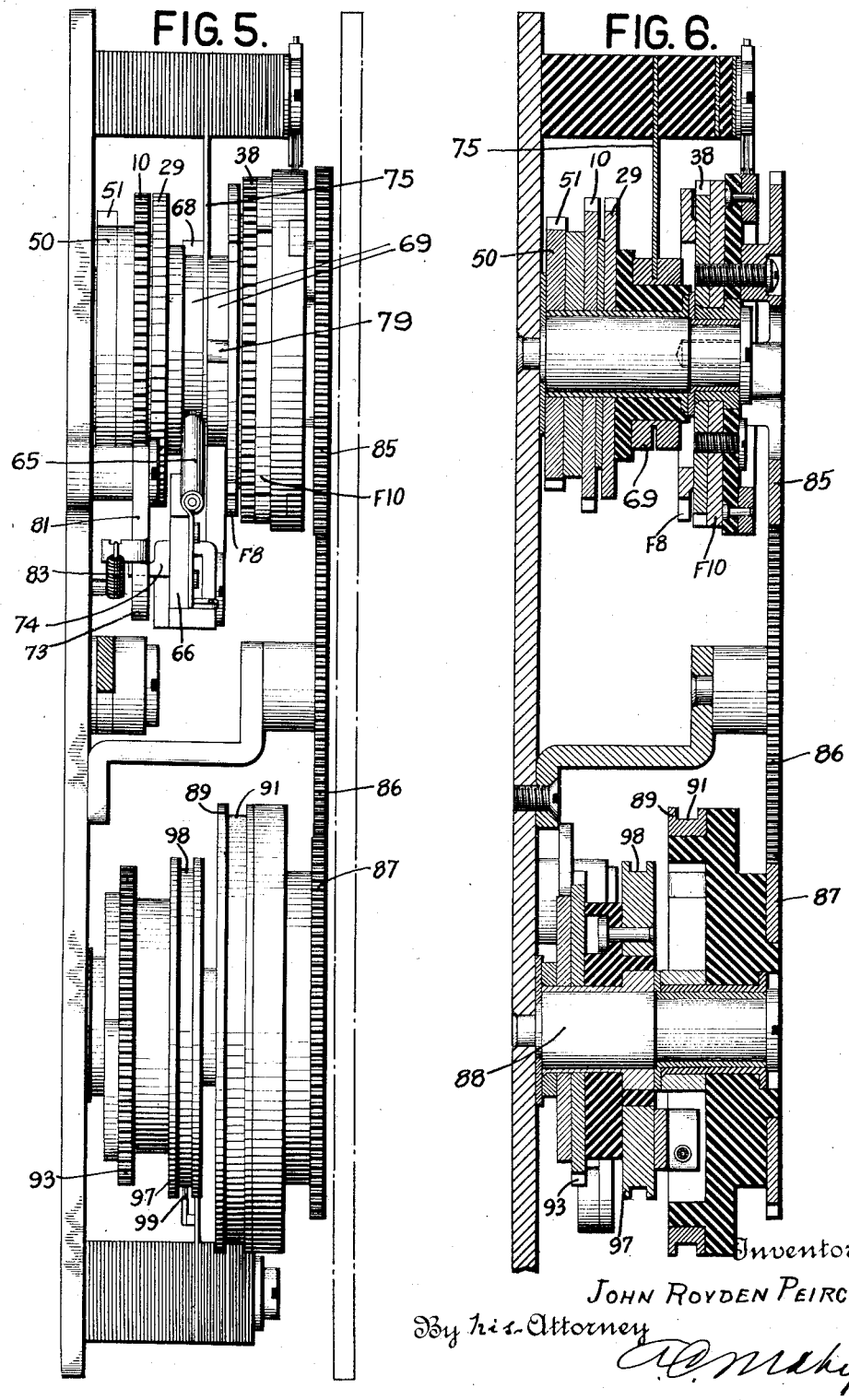

Inventor
JOHN ROYDEN PEIRCE
By his Attorney

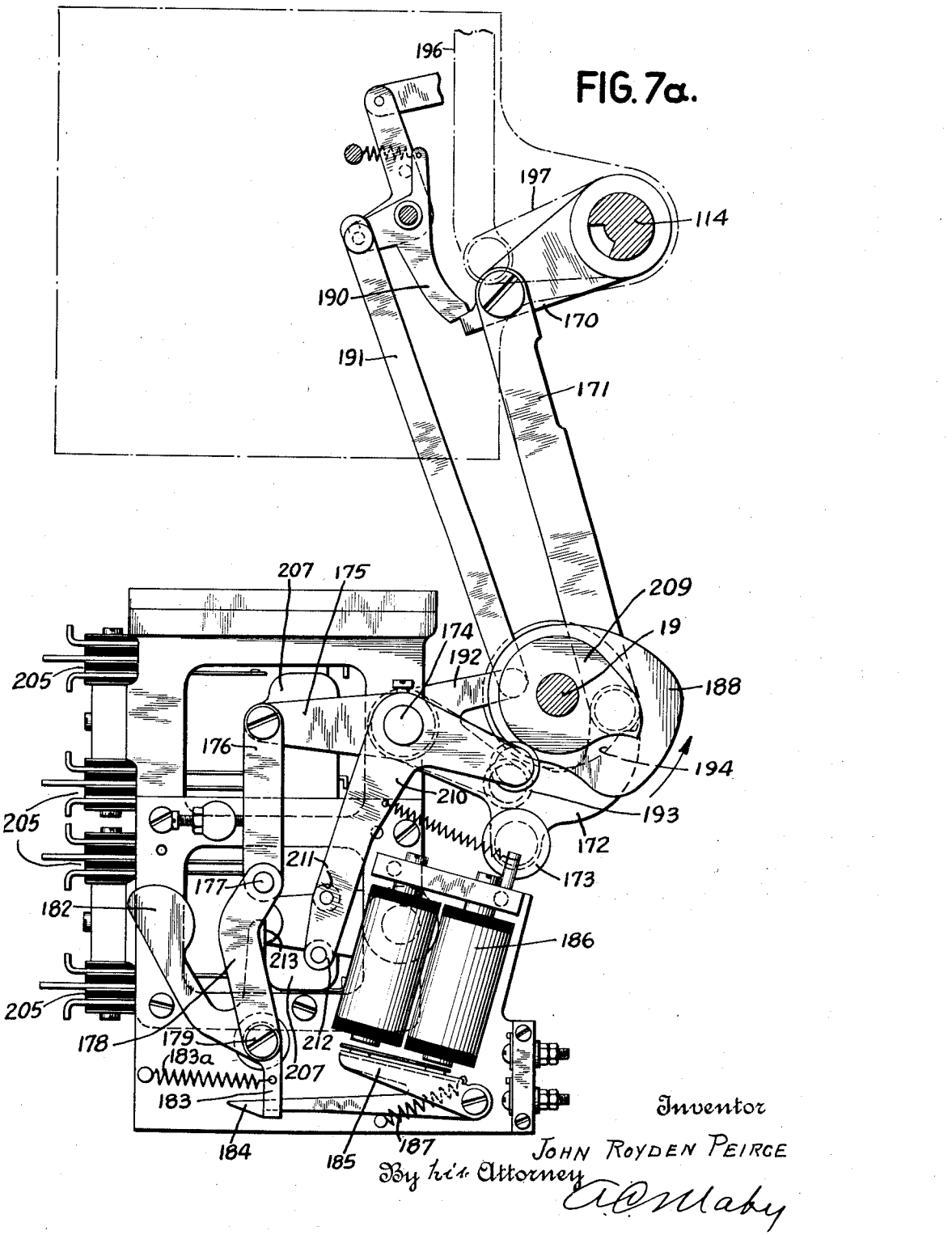

June 13, 1933. J. R. PEIRCE 1,914,285
ACCOUNTING MACHINE
Filed Feb. 7, 1930  11 Sheets-Sheet 8

Inventor
JOHN ROYDEN PEIRCE
By his Attorney

June 13, 1933.    J. R. PEIRCE    1,914,285
ACCOUNTING MACHINE
Filed Feb. 7, 1930    11 Sheets-Sheet 9
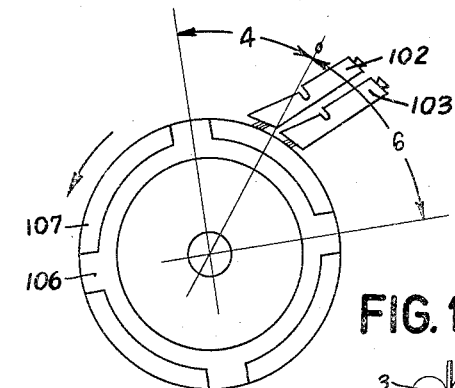
FIG. 12.
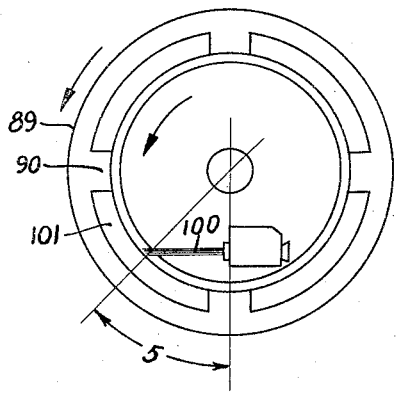
FIG. 13.
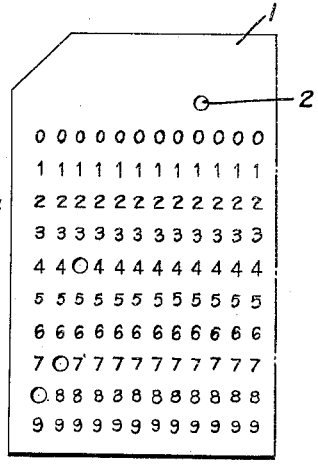
FIG. 13a.
FIG. 14.
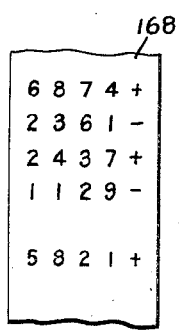
FIG. 15.
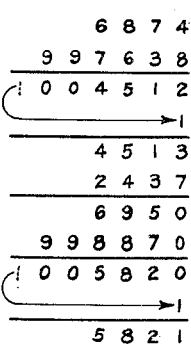
FIG. 16
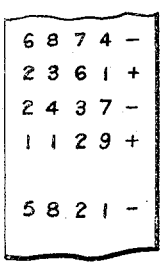
FIG. 17.
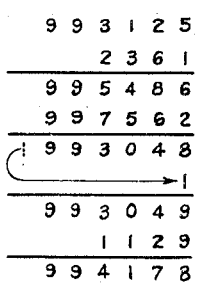
Inventor
JOHN ROYDEN PEIRCE
By his Attorney

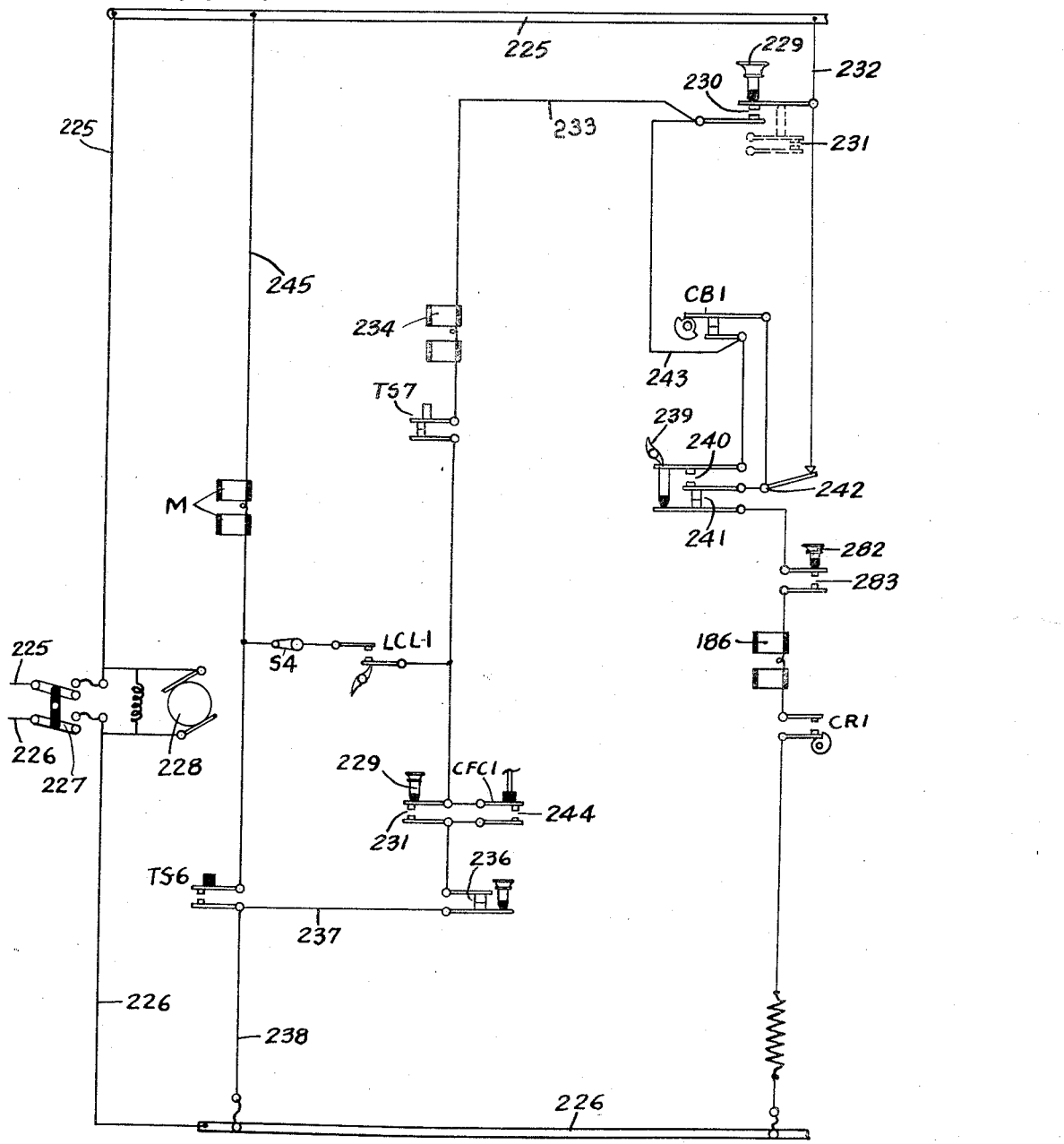

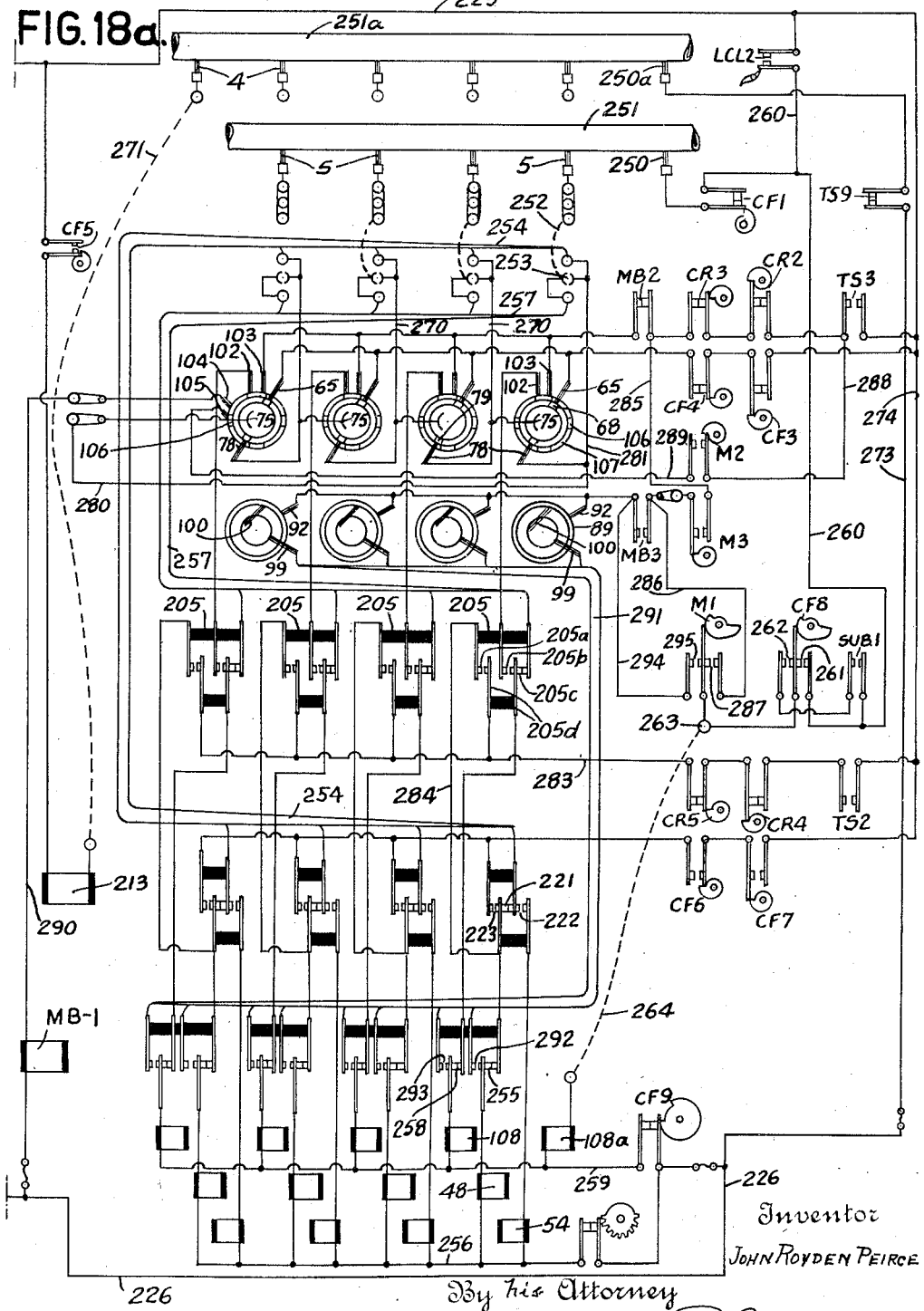

Patented June 13, 1933

1,914,285

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

ACCOUNTING MACHINE

Application filed February 7, 1930. Serial No. 426,582.

This invention relates to perforated card controlled accounting machines and more particularly to accumulating devices used in such machines.

In my copending application for patent, Serial No. 442,348, filed April 7, 1930, I disclose a tabulating machine adapted to analyze perforated records as the records are being fed through the machine and to accumulate data contained on such record cards and also to print totals of data accumulated from such cards.

In the present application I disclose an accumulating device adapted for use in such a machine.

One of the objects of the present invention is to devise an accumulating device which will add and subtract data taken from perforated cards.

Another object is to devise means for printing totals contained in such an accumulator and to ascertain whether the total so printed is a positive or a negative amount.

Another object is to print a list of items being added and subtracted and to indicate on such list whether the separate items are added or subtracted. After several numbers have been added and subtracted, if the total of the amounts added is greater than the total of the amounts subtracted, the difference, which will be the amount contained in the accumulators will be a positive amount, while if the total of the amounts subtracted is greater than the total of the amounts added, the difference standing in the accumulators will be a negative amount. When the amount is a negative amount the accumulator pinions of the highest orders in the accumulator will register nines.

One of the objects of the present invention is to provide means for detecting the presence of a nine in the highest order pinion in the accumulator and upon finding such nine, to cause the machine to print the complements of the digit values in the accumulator to thus indicate the negative total.

These and other objects will appear in the following description of the invention.

Referring to the drawings wherein I have shown what I now consider to be the preferred form of my invention;

Fig. 3 is a side elevation of one of the accumulator units with portions broken away to more clearly disclose certain parts of the device.

Fig. 4 is a similar side elevation of an accumulator unit, parts being shown in section to more clearly disclose the otherwise hidden portions.

Fig. 5 is a section taken on line 5—5 of Fig. 3 of the accumulator unit.

Fig. 6 is a section taken on line 6—6 of Fig. 3.

Fig. 7a is a detail of a total control device.

Fig. 12 is a detail of commutators used to control the printing of a number when the total is a negative amount.

Fig. 13 is a view of a portion of a card used to control the machine.

Fig. 13a is a diagrammatic view of the card feeding mechanism.

Fig. 14 is a section of a listing strip containing items printed on the machine under control of perforated cards and indicating whether the items are added or subtracted.

Fig. 15 is an illustration of the operation of the machine in adding and subtracting the amounts contained on the list sheet in Fig. 14.

Fig. 16 is a portion of a listing sheet printed under control of cards where the amounts added in Figs. 14 and 15 are subtracted and amounts subtracted in Figs. 14 and 15 are added so as to ultimately produce the opposite result to that produced in Fig. 15.

Fig. 17 is an illustration of the successive operations of the machine in adding and subtracting the amounts on the listing sheet of Fig. 16.

Figs. 18 and 18a are wiring diagrams of the operation of the machine, Fig. 18 being a diagram of the control of the machine proper, and Fig. 18a a diagram of the control of the accumulators for adding, subtracting and totaling.

Figure 1:
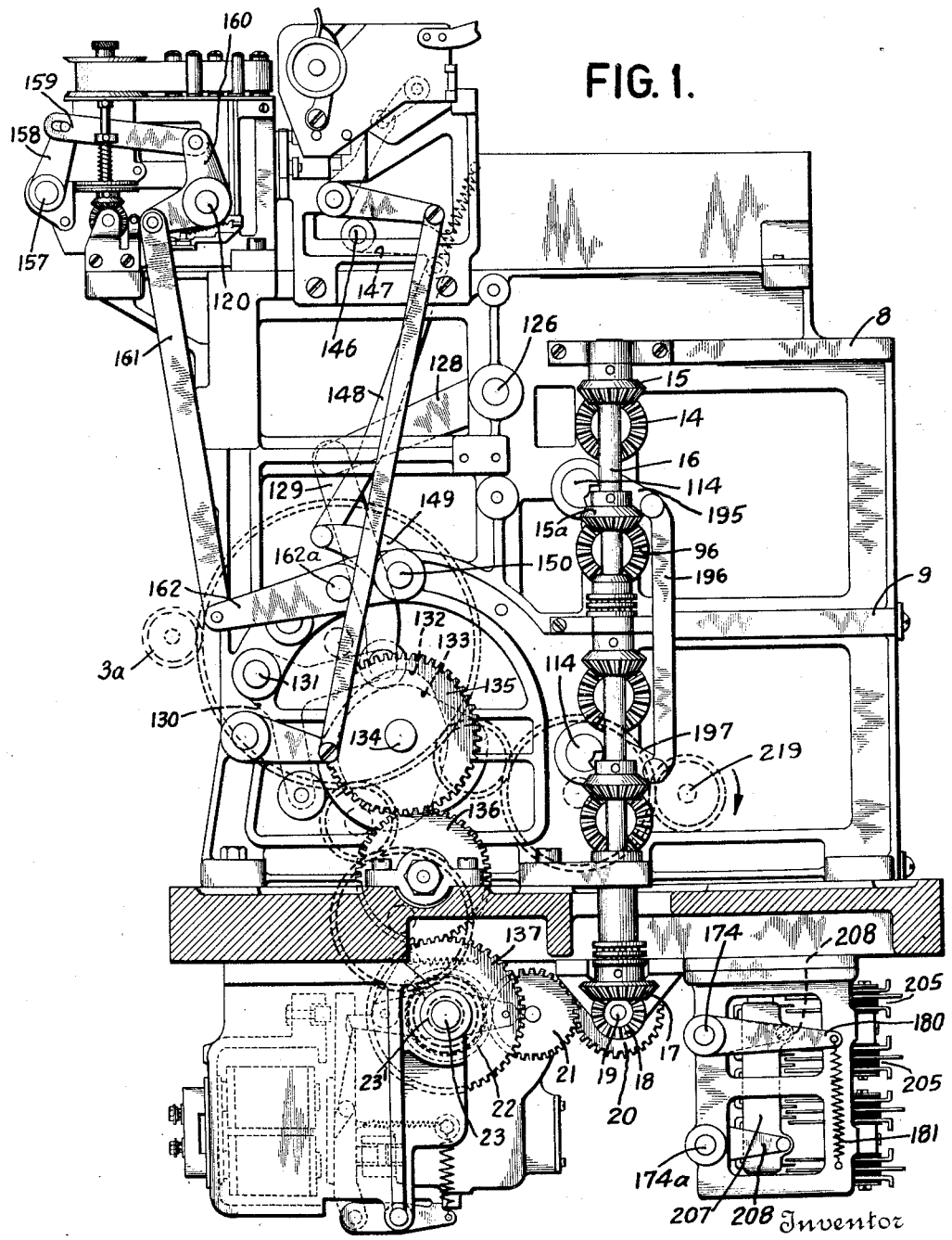
Fig. 1 is a side view partly in section of a machine embodying my invention.

Referring to the card 1 disclosed in Fig. 13, a plurality of columns of index point positions ranging from zero to nine are shown. The amount which is to be added or subtracted is entered by perforations in successive columns. Thus the number 874 is entered by punching the card in the 8 position in the first column and in the 7 position in the second column and in the fourth position in the third column. The amount is punched in this manner whether it is to be added or subtracted. If it is to be subtracted, a control perforation 2 is made in the upper portion of the card to control the machine to effect subtracting instead of adding. In the absence of such a perforation 2 the machine will effect a normal adding operation. In Fig. 13 the perforation 2 is shown above the ninth column of data on the card. In actual practice this perforation may be made above any of the columns and the machine may be plugged to be controlled by a perforation above any column. Thus if the ninth column is to be used to designate the 12 months of the year, the position above the zero in this column which is shown perforated will be used to indicate the eleventh month of the year and the next higher position will be used to indicate the twelfth month. In this case the perforation 2 will be effected in any other column and the machine would be plugged to control for subtracting from such other column. The card is fed through the machine by feed rollers 3 (Fig. 13a) driven through pinions 3a as in Fig. 1 and will be analyzed by perforation sensing brushes 4 and 5. The card is fed past the brushes with the nines passing under the brushes first, followed by the eights and then sevens and so on, in a manner which is well known in this art.

The upper row of brushes 4 is used for controlling while the lower brushes 5 effect the adding or subtracting of the data contained on the card. If the data is to be added and a perforation appears in the first column in the 8 position as in Fig. 13, when the perforation passes under the brush 5 the accumulator will be set to commence adding one unit as each of the succeeding points on the card passes under the brush 5. When the zero position is passing under the brush the machine automatically demeshes the accumulator so that it stops turning. It will thus have turned eight points to accumulate the value 8. In the second column the brush 5 will contact with the perforation in the 7 position and throw in its respective accumulator to commence adding at this point and 7 will have been added when the accumulator is demeshed. In the third column the accumulator will be thrown in when the brush senses the perforation in the 4 position and 4 will be added. This is the manner of operation when the amount is being added, there being no perforation 2 in the card. When the perforation 2 is present, however, it will be sensed by a brush 4 in the upper row of sensing brushes and the accumulator actuating pinions will all be thrown into mesh so as to commence adding in all orders when the nine position on the card passes under the brushes 5. When a perforation is now sensed by the brushes 5 in any particular column the accumulator pinion of that particular column will be disengaged so as to stop accumulating. Thus with the card of Fig. 13 containing the perforation 2, the accumulator pinion of the first column will commence accumulating as the nine position passes its brush 5. Then when the 8 position passes the brush the perforation in this position will be sensed and the energization of an electromagnet will cause the accumulator pinion to be disengaged so that it will stop turning and accumulating.

Figure 2:
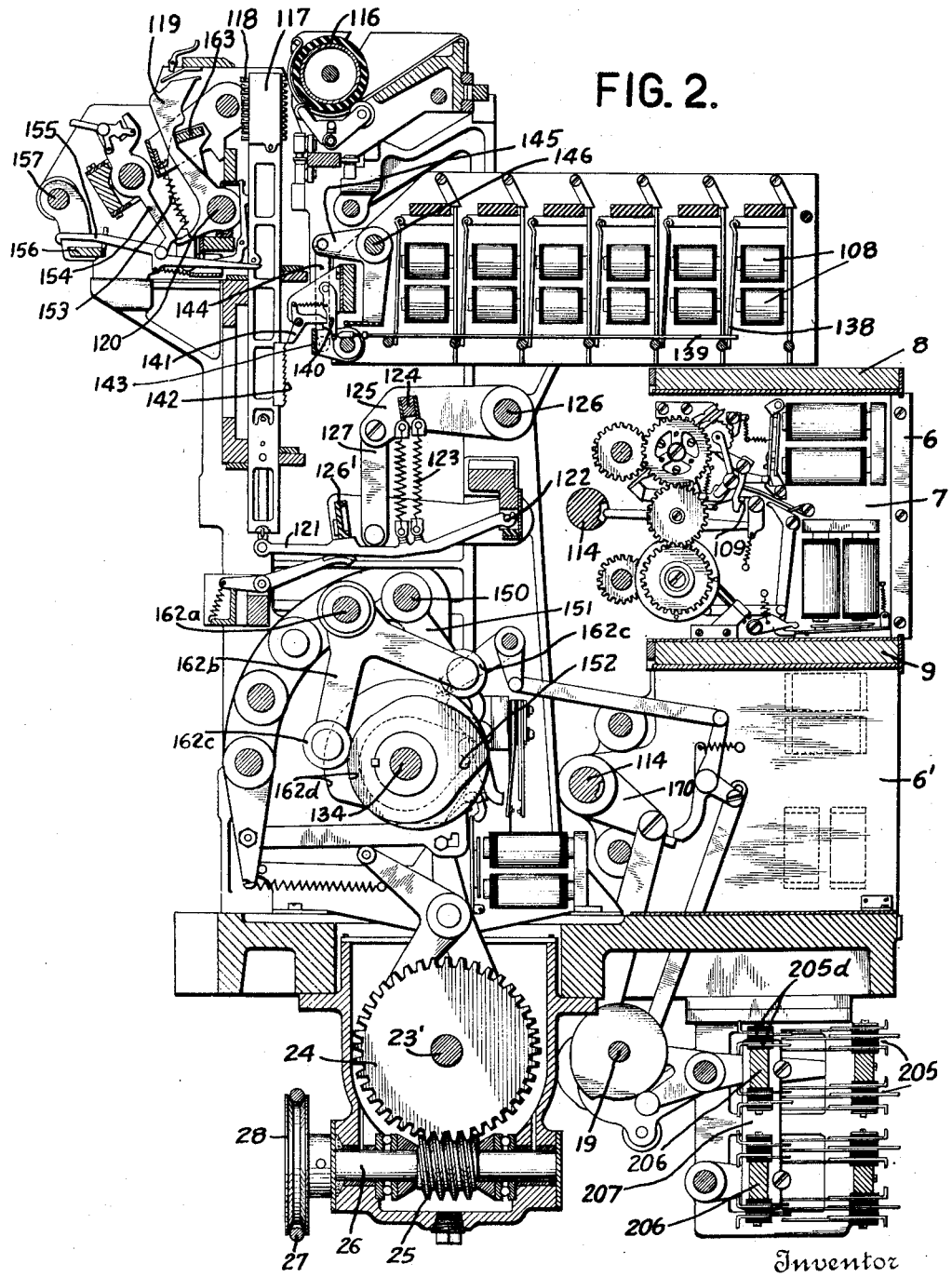
Fig. 2 is a similar view, parts being shown in section to show the interior of the machine including the printing mechanisms and one of the accumulator units.

This pinion will thus have turned one point to accumulate the value 1 which is the complement of the numeral 8. In the second column the pinion commencing to rotate when the position 9 passes the brush will be thrown out when the 7 position passes the brush after the value 2 has been added, this being the complement of the value 7. In the third column the pinion will be thrown out when the 4 position passes the brush and the pinion will have added 5 which is the complement of 4. In Fig. 2 one of the accumulator units is indicated at 6. The mechanisms of each unit may be mounted on a plate 7 as indicated in Figs. 3 and 4 and this plate may be mounted in the machine by sliding it into supporting frame members 8, 9. A number of these units may be mounted in the machine side by side. Other such units as indicated at 6' (Fig. 2) may be mounted below the upper row of units. As shown in Fig. 4, each accumulator unit has a gear 10 rotatably mounted on a stud 11 fixed in the plate 7. This gear is in constant mesh with a gear 12 mounted on a shaft 13 on which is also mounted a bevel gear 14 (Fig. 1) meshing with a bevel gear 15 on a shaft 16. The shaft has a bevel pinion 17 meshing with a bevel pinion 18 on shaft 19 which has a gear 20 meshing with an idler gear 21 which in turn meshes with gear 22 on shaft 23'. The latter shaft is provided with a worm wheel 24 (Fig. 2) meshing with a worm 25 on a shaft 26 which is driven by a belt 27 on the grooved pulley 28 fixed to the shaft 26. The belt 27 is, of course, driven by an electric motor or other source of power. The motor is constantly running while the machine is in operation so that shaft 16 is turning constantly. This in turn causes the gear 10 of the accumulator unit to rotate constantly.

Fixed with respect to gear 10 (Fig. 4) is a gear 29 adapted to mesh with gear 30 fixed on a sleeve 31 loose on shaft 32 mounted in upper and lower arms 33, 34, which are fixed on sleeve 35 which is loose on the stud 36. The gear 30 is normally disengaged from the gear 29. The teeth of the gears 29 and 30 are so pitched that the gear 30 may be moved into or out of mesh with the gear 29 while the latter is in continuous motion. Also fixed on the sleeve 31 with gear 30 is a gear 37 (Fig. 3). This gear 37 is in constant mesh with a gear 38 loose on stud 11. The teeth of the gear 37 are longer than those of gear 30 so that the gear 37 may be moved toward and away from the gear 38 when the gear 30 is moved into and out of mesh with gear 29 without causing disengagement between gears 37 and 38. A spring 39 attached to posts 40, 41 in the plate 7 engages the arm 34 at the point 42 as indicated in Fig. 4. An arm 43 engaging the spring 39 as at 44 tensions the spring to cause the arm 34 to turn counterclockwise on the stud 36. An extension 45 of the arm 34 is normally latched by a latching member 46 fixed to the armature 47 of an electromagnet 48, the armature being held in such position by a spring 49. When the magnet is energized attracting its armature the latch 46 releases the arm 45 and the spring 39 rocks the gear 30 into mesh with the gear 29. The energization of magnet 48 is effected during adding operations by the sensing of a perforation in one of the data columns of the control card 1 by the respective sensing brush 5. The gear 30 is then thrown into mesh with gear 29 while the latter is rotating. The gear 30 is thus caused to rotate until the zero position on the card reaches the brush 5 at which time it is thrown out of mesh with the gear 29. This de-meshing is effected by a cam 50 having projections 51, 52 (Figs. 4 and 5).

The cam is fixed with respect to gears 10 and 29 and is thus constantly rotating with them. As shown in Fig. 4 there are two projections 51 and two projections 52 on the cam 50. The cam is timed to turn a half revolution for each accumulating cycle. After the gear 30 has been thrown into mesh with gear 29 and commences to rotate, as soon as the projection 51 reaches an arm 53 fixed to arm 34, it will cam the arm 53 outwardly rocking the arms 33, 34 about their pivot 36 to move the gear 30 out of mesh with gear 29 so that the gear 30 will cease to rotate. The parts will then be latched in this position by the armature latch 46. An impositive latch 53a will prevent overthrow of the gear 37. Gear 29 also has an impositive latch 53b. If the amount on the card is to be subtracted instead of added, then when brush 4 detects a perforation 2 in the card 1, all of the magnets 48 will be energized when the card reaches its nine position under the lower brushes 5 so that the several gears 30 will be thrown into mesh with their gears 29 as the brushes 5 pass the nine position of the card. The gears 30 will then rotate until a perforation in their respective columns passes under a brush 5. This will cause the energization of an electromagnet 54. The armature 55 of this magnet has attached thereto a latching member 56 pivoted at 57 and actuated by a spring 58 into position to latch arm 59 in the position of Figs. 3 and 4. A spring 60 attached to the arm 59 tends to rock the latter counterclockwise about its pivot 61. When the gear 30 rocks into mesh with gear 29 an arm 62 integral with arms 33, 34 moves into engagement with the end 63 of arm 59.

Figure 7:
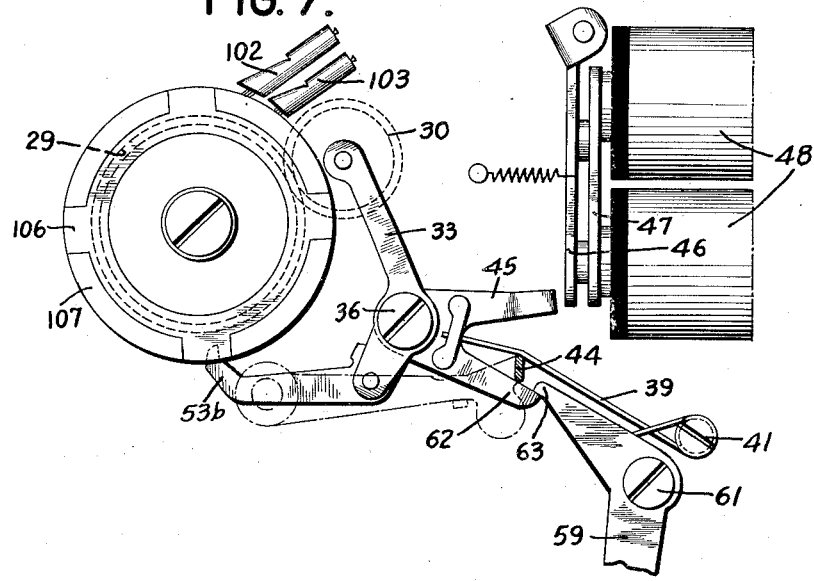
Fig. 7 is a detail of the accumulator unit with the parts in position to accumulate data.

Thus when the magnet 54 becomes energized and the latch 56 releases the arm 59, the spring 60 will rock the arm counterclockwise depressing the arm 62 (Fig. 7) and rocking the arms 33, 34 clockwise about their pivot 36 to de-mesh the gear 30 from gear 29. Thus if the magnet 48 is energized by a reason of a subtracting perforation 2 in the card to cause the gear 30 to commence to rotate when the nine position on the card passes the brush 5, when a value perforation in the particular column passes the brush 5 and causes the magnet 54 to be energized, the gear 30 will be thrown out of mesh after having turned the accumulator 38 an amount equal to the complement of the value represented by the perforation in the particular column of the card. When the arm 59 rocks the gear 30 out of mesh with gear 29 the armature latch 46 will latch the gear in this de-meshed position. The arm 59 is restored by means of a cam member 59a carried by the shaft 88. The cam actuates the arm 59b which in turn is connected to a link 59c having pin and slot connection with the arm 59. When the link 59c is pulled to the left it not only restores the arm 59 to the position of Fig. 4 but also cams the arm 59d downwardly to move the armature 56 into position to latch the arm 59 in its restored position as in Fig. 4. The lost motion connection between arm 59 and the link 59c permits the arm 59 to operate without interference from the link 59c as soon as it is released by the armature 56.

Carrying

For effecting carrying from one order to the next higher order a brush 65 fixed to an arm 66 pivoted at 67 is adapted to cooperate with a segment 68 on a disk 69 mounted on stud 11 and fixed with respect to gears 10 and 29. When the adding wheel 38 (Fig. 3) of a given order passes from its nine position to its zero position, a projection 70 (see Figs. 10 and 11) on disk 71 fixed with respect to the gear 38 will engage a projection 72 on the arm 66 and rock the arm into the position of Fig. 11. The latching pawl 73 will then cooperate with a projection 74 (see Fig. 5) on the arm 66 and latch the arm in this position so that the brush 65 will be in position to make contact with the commutator segment 68 when the latter which is constantly rotating passes the brush.

This contacting will take place as soon as the projection 51 associated with the adding unit of the next higher order has engaged the arm 53 and cammed the gear 30 out of mesh with gear 29. The contacting of brush 65 with segment 68 will supply current through disk 69, to the contact leaf 75 and then to the magnet 48 of the adding unit of the next higher order. Gear 30 will reengage and turn gear 38 one more step and then be cammed out by cam point 52. If the value standing in the adding wheel of any adding unit happens to be nine when one is added to that order causing the adding wheel to pass from the nine position to the zero position, it will be necessary to continue the carrying on to the adding unit of the next higher order. In order that this may be effected when the adding wheel 29 of any order stands at the nine position, its disk 71 will present a depression 76 to the arm 72 as in Fig. 10, permitting the arm 66 to be rocked counterclockwise by its spring 77 into the position of Fig. 10, rocking the brush 78 also carried by the arm 66 into position to be engaged by a commutator segment 79 also on the disk 69. The brushes 78 and 65 are insulated from each other and current is supplied to them through separate wires but both brushes are adapted to carry current to the disk 69 and through the leaf contact 75 to the adding magnet 48 of the next higher order. The segment 79 engages the brush 78 at the same time that the segment 68 is adapted to engage its brush 65. Thus if the adding wheel of a given order passes to zero position and supplies current to the brush 78 of the adding unit of the next higher order, if the latter unit contains the value nine, it besides being caused to accumulate an additional one by reason of the position of the brush 65 in the unit of the next lower order, will supply current through its brush 78 to the adding unit of the next higher order to carry one thereto.

Figures 10, 11:
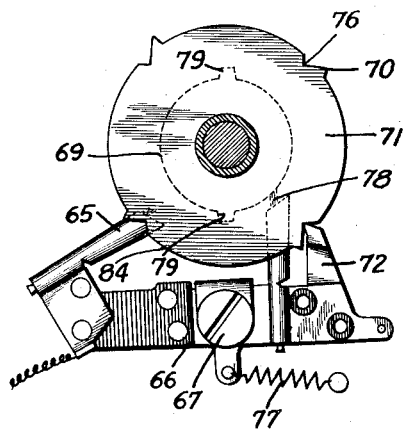
Figs. 10 and 11 are details of mechanism for effecting carrying from one adding pinion to that of the next higher order.

Of course, if the cam disk 71 of a given order is standing in its nine position, as in Fig. 10, as soon as one is added to this unit, the cam disk 71 will turn one more step to the position of Fig. 11. This will rock the brush arm 66 to the position of Fig. 11 but current will already have been supplied through brush 78 to perform the carrying function in the next unit. The rocking of the arm 66 to this position to cause the brush 65 to be engaged by its commutator segment 68 will have taken place too late to effect the carry in the next higher order. It is for this reason that the brush 78 is provided. The rocking of the brush 65 to this position thus has no effect and it will be restored to normal position before the next segment 68 reaches it. After the brush arm 66 has been rocked to the position of Fig. 11 and latched by the pawl 73 and after the segment 68 has passed the brush 65 the arm 66 is released by projection 80 engaging the inner projection 81 of the latching pawl arm 73 which is pivoted at 82, rocking the pawl against the action of its spring 83 and releasing the arm 66 to permit its spring 77 to rock it counterclockwise until the projection 72 engages the periphery 84 of the disk 71. The arm 66 will now be in such position that neither brush 65 nor 78 will make contact with the disk 69.

Fixed with respect to the adding wheel 38 is a gear 85 meshing with an idler 86 which in turn meshes with a gear 87 loose on a stud 88. Fixed to the gear 87 is a commutator disk 89 having four commutator segments 90. The rotation of the adding wheel 38 thus causes the gear 87 and the commutator 89 to rotate a corresponding amount. The commutator disk 89 is provided with a circumferential groove 91 engaged by a brush 92. Also mounted on the stud 88 is a gear 93 (Fig. 5) meshing with a gear 94 (Figs. 3 and 4) on the same shaft 95 with a bevel pinion 96 (Fig. 1) driven by bevel pinion 15a on shaft 16.

The gear 93 (see also Fig. 4) is thus constantly rotating. Fixed with respect to this gear is a commutator disk 97 having a circumferential groove 98 engaged by a brush 99. Fixed to the commutator disk 97 is a brush 100. The brush is thus constantly carried around by the disk 97 and wipes over the insulated portions 101 and the segments 90. This brush and these segments are used for controlling the printing of a total where the amounts added and subtracted yield a negative balance. That is, where the sum of the various amounts substracted is greater than the sum of the various amounts added in the machine. If the total to be printed is a positive amount, that is, if the sum of the several amounts added is greater than the sum of the several amounts subtracted, the total will be printed under control of brushes 102, 103. Whether the amount is to be printed as a plus or a minus balance is ascertained by brushes 104, 105 mounted in the accumulator unit of the highest order. These brushes are adapted to engage segments 106 on a commutator 107. Where the total is a negative total this unit of the highest order will always contain a nine and the brushes 104, 105 are used to test this accumulator to ascertain whether it contains a nine. If it does not, then the brushes 102, 103 will cooperate with the segments 106 to energize the printing magnets 108 (Fig. 2) which control the printing of the total. If the brushes 104, 105 find a nine in the adding unit of the highest order, then circuits are closed so that the brush 100 will cooperate with the segments 90 to control the energization of the printing magnets 108. When a total is to be printed the adding magnets 48 are energized at the beg'nning of a machine cycle to cause the gear 30 to mesh with gear 29. This will cause gears 38, 85, 86, 87 and commutators 107, 101 with their respective segments 106 and 90 to all rotate.

If the amount to be printed is a positive amount, when the first segment 106 bridges the brushes 102, 103, the printing magnets 108 will be energized to effect printing. If the amount to be printed is a negative amount, then the brushes 102, 103 will be ineffective and the brush 100 will cooperate with segment 90 to control printing. In printing a total, as stated above, the adding magnets 48 are energized at the beginning of a machine cycle. If it is desired to reintroduce the total printed into the accumulator the accumulator gears 38 are permitted to turn through 10 adding points before they are demeshed. This brings them back to the same relative positions they occupied before the total cycle was initiated. In this connection cam projection 51 will engage the arm 53 and throw the gear 30 out of mesh with gear 29. When the parts are thus demeshed the armature latch 46 will engage arm 45 and latch gear 30 out of mesh with gear 29. If it is desired on the other hand to clear accumulator for the addition of new data a projection 109 on arm 43 will be unlatched. This projection is adapted to cooperate with a latching arm 110 loose on the stud 203. Arm 43 has pin and slot connection with a link 111 connected to an arm 112 pivoted at 113 and engaging a slotted shaft 114 at its rear end. Arm 112 holds the arm 43 against spring 39. When the slotted shaft 114 releases arm 112 the projection 109 will cooperate with latch 110 to hold the arm 43 against spring 39. Latch 110 will be rocked when the accumulator reaches zero position so that if arm 112 is not holding arm 43 the latter will release spring 39 and the gear 30 will be rocked out of mesh leaving the accumulator parts at zero.

If shaft 114 holds arm 112 in position to maintain the pressure of arm 43 against spring 39 then gear 30 will remain in mesh until cammed out by cam projection 51 and the parts will have turned ten points and will again contain the value they started with.

*Printing mechanisms*

The printing mechanism which is shown in greater detail in my aforesaid copending application includes a platen 116 and a type carrier 117 having a plurality of type elements 118 adapted to be struck by a hammer 119 loose on a rod 120. The type carrier is connected at its lower end to an arm 121 fulcrumed at 122. Springs 123 connected to the arm 121 and to a cross beam 124 connected between arms 125 pivoted at 126 tend to raise the arm 121 to raise the type carriers 117. A restoring bail 126' connected by links 127 to arms 125 is adapted to restore the arms 121 to their lower or normal position. An arm 128 (Fig. 1) fixed to the shaft 126 on which the arms 125 are also fixed is connected by a link 129 to complementary cam follower arm 130 pivoted at 131 and cooperating with cams 132, 133 on cam shaft 134. Shaft 134 is driven through a chain of gears 135, 136, 137, the latter of which is mounted on shaft 23. The shaft 134 turns synchronously with the feeding of the cards through the machine and the bail 126' is thus raised so as to permit the type carrier 117 to rise synchronously with the feeding of the card. Thus when the type element 118 carrying the numeral nine is approaching the printing line with respect to platen 116 and the actuating hammer 119, the nine position on the card will be passing the reading brushes 5.

If there is a hole at the nine position, a circuit will be closed through the brush 5 to the printing magnet 108 of that particular column. This will attract the armature 138 actuating a rod 139 which is connected to a latching member 140. This will release the latching pawl 141 permitting it to cooperate with the ratchet teeth 142 carried by the type carrier to stop the type carrier with the nine type in line for printing. When the arms 125 raise the bail 126' to permit the type carriers to rise, the springs 123 will be stretched so as to raise the arm 121 of the type carrier. After printing has been effected, the arms 125 are then lowered with the bail 126' to restore the type carriers to normal position. The latching pawls 141 must then be restored before the type bars begin their next upward movement. For this purpose a bail 143 is adapted when rocked clockwise, to rock the latching pawl 141 counterclockwise against the action of its spring and permit it to be latched by the latch 140. The bail 143 is connected by links 144 to arms 145 fixed on shaft 146 on which is also fixed an arm 147 connected by link 148 to an arm 149 pivoted at 150 and connected to a cam follower arm 151 adapted to be actuated by a cam 152 on shaft 134. The several type actuating hammers 119 are actuated by individual springs 153 tending to rock them against the type 118 to effect printing. The hammers are normally locked in their inoperative position by individual latches 154. These latches are connected to arm 155 adapted to be moved to the left by a bar 156 when the rising of the particular type carrier 117 permits the arm 155 to rock counterclockwise so as to be actuated by the bar 156.

The bar or bail 156 is pivoted at 157 and is connected to an arm 158 connected by a link 159 to a bell crank 160 in turn connected by a link 161 to an arm 162 fixed at 162a to a shaft which carries (in Fig. 2) a cam follower arm 162b having rollers 162c cooperating with complementary cams 162d mounted on shaft 134. The bail 163 which restores the hammers to normal position is fixed on the shaft 120 with the arm 160. The pin and slot connection between pin 159 and arm 158 permits the shaft 164 to turn clockwise far enough to move the bail 163 out of the way of the hammers 119 before the arm 158 and bail 156 are actuated to release the hammers. Where listing is to be effected on the listing sheet 168 as in Figs. 14 and 16, while the data is also being accumulated, the printing magnets 108 will be connected to receive an impulse through the perforation in the card simultaneously with the transmission of such impulse to the accumulator magnet 48.

Figure 8:
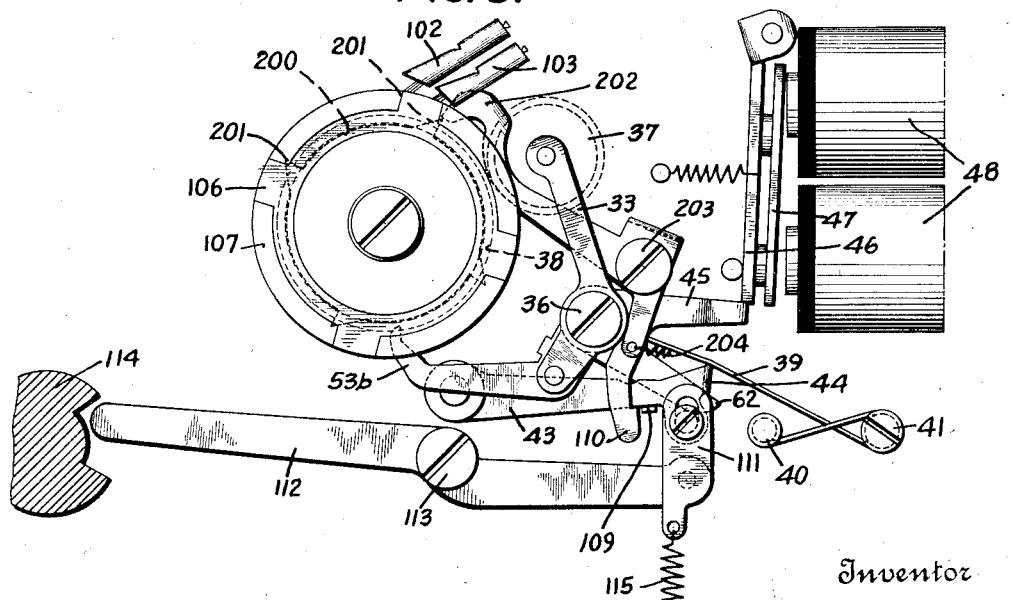
Fig. 8 is a detail of the accumulator unit with the parts locked in zero and non-accumulating position.

When a total is being printed under control of the accumulators, if the grooved bar 114 is in the position of Fig. 3 locking the projection 109 in its upper position, the total which is taken from the accumulator wheels will be returned thereto so that a subsequent series of accumulating operations will add data to the previous total to effect accumulative sub-totaling. If the bar 114 is in the position of Fig. 8 releasing the lever 112, the projection 109 will be free to move to its lower position as in Fig. 8 so that when the total is printed the accumulator pinions will rest in their zero position cleared of all data and ready to commence adding for an entirely new total. Means for controlling the setting of the bar 114 is shown in Fig. 7a.

The parts in Fig. 7a are shown from the opposite side of the machine to that disclosed in Figs. 1, 2, 3, 4 and 8 in order to show the operating mechanism which is located on the other side of the framework. Fixed on the lower bar 114 is an arm 170 connected by a link 171 to a cam follower arm 172 having a cam follower roller 173. The arm is loose on a shaft 174 on which is fixed an arm 175 connected to a link 176. The link 176 is connected at 177 to a link 178 pivoted at 179. Links 176 and 178 thus form a toggle. Also fixed on shaft 174 is an arm 180 (Fig. 1) to which is connected a spring 181. Loosely pivoted at 179 (Fig. 7a) is a hammer 182 having a depending projection 183 held by a latch 184 fixed to the armature 185 of magnet 186. Spring 187 holds the parts in latching position. When the magnet 186 is energized the latch 184 is rocked upwardly releasing the hammer 182 and the latter is actuated by its spring 183a to strike the toggle arm 178 which is normally in a position to the left of its center, the spring 181 bearing downwardly on arm 175. The parts are moved to the right of this center by the hammer. This takes place just as the cam 188 which is on constantly rotating shaft 19 is moving to position to permit the follower 173 to follow inwardly. The arm 170 is normally held by a spring-pressed latching pawl 190 which is connected by a link 191 to a cam follower arm 192 fixed on shaft 174 and having a cam follower 193 adapted to cooperate with a cam 194 fixed on shaft 19. When the hammer 182 breaks the toggle 176, 178 the follower 193 will be free to follow cam 194 upwardly under the action of spring 181 thus rocking the latch 190 to release the arm 170.

The action of the springs 115 on arms 112 will thus rock the bar 114 counterclockwise in Figs. 3 and 4 and clockwise in Fig. 7a as the follower 173 follows the cam 188. The upper bar 114 is connected to the lower bar through an arm 195 fixed on the upper bar 114 and connected by a link 196 to an arm 197 which is fixed on the lower bar 114 so that both bars will rock at the same time. With the bars 114 in the position of Fig. 8, when a total is taken with the gear 30 in mesh with gear 29 when the gear 29 reaches its zero position a cam disk 200 fixed with respect to gear 29 and provided with cam projections 201 will cause an arm 202 to rock clockwise about its pivot 203 (Fig. 8) against the action of a spring 204. The latch 110 is fixed to the arm 202 and will thus be rocked from the position of Fig. 3 where it latches the arm 43 in its upper position by cooperation with the projection 109, to the position of Fig. 8. With the arms 112 now released by the bars 114, spring 39 will press the arm 43 downwardly to the position of Fig. 8. The end 42 of arm 43 reaches over the finger 62 so that spring 39, through arm 43 presses downwardly on finger 62 tending to rock the arm 33 clockwise while the end of the spring is tending to rock it counterclockwise. The greater leverage of finger 62 prevails and the gear 30 is disengaged from gear 29 leaving the accumulating gear 38 in its zero position.

If the bar 114 holds the arm 43 against spring 39, then when arm 202 is cammed out and rocks latch 110 away from projection 109, the arm 43 will not move downwardly to rock finger 62. Gear 30 will then remain in mesh with gear 29 and the accumulating gear 38 will continue to turn after it has reached zero and the type carriers have been set for printing.

The accumulating gear will continue to turn until gear 30 is cammed out by cam projection 51. The accumulator will thus be back in position representing the value that it represented before the total was taken.

Toggle links 176, 178 of Figs. 7a are adapted also to control the condition of sets of electric contacts 205. Each of these sets of contacts includes contacts 205a, 205b, 205c (Fig. 18a). Here the contacts 205c are shown closed while the contacts 205a and 205b are shown open. The toggle is adapted to shift all of these contacts so that all of the contacts 205c will become opened and all of contacts 205a and 205b will become closed. To this end all of the contact blades 205d (Fig. 1) are carried by bars 206 (Fig. 2). The opposite ends of these bars are attached to plates 207. Plates 207 are in turn carried by the arms 208 (see also Fig. 1). The arms 208 are fixed on the shafts 174, 174a on which the arm 180 and arm 175 are fixed. When the toggle is broken in Fig. 7a the arm 175 will rock downwardly permitting shaft 174 to rock counterclockwise. This will permit the plates 207 and the bars 206 to move downwardly to shift all of the contact blades 205d to open the normally opened contacts. The function of these contacts will be described in conection with the diagram of Fig. 18a. After a total has been taken the parts of Fig. 7a will be restored to their normal position. This is effected by the continued rotation of shaft 19. The cam 188 will cam the follower 173 down to rock the arm 170 into position to be latched by the latching pawl 190. The cam 194 will actuate its follower 193 to rock the latch 190 over the arm 170 to latch the bar 114 in its restored position. A cam 209 fixed on shaft 19 is adapted to actuate a bell crank arm 210 loose on shaft 174.

A stud 211 carried by the bell crank is adapted to engage the toggle to move the latter to the left past its center line position where it will be held by the action of spring 181. Another stud 212 on the bell crank 219 will engage the finger 213 of the hammer 122 to rock the hammer counterclockwise to its normal position where it will become latched by the armature latch 184.

Subtracting magnet

Figure 9:
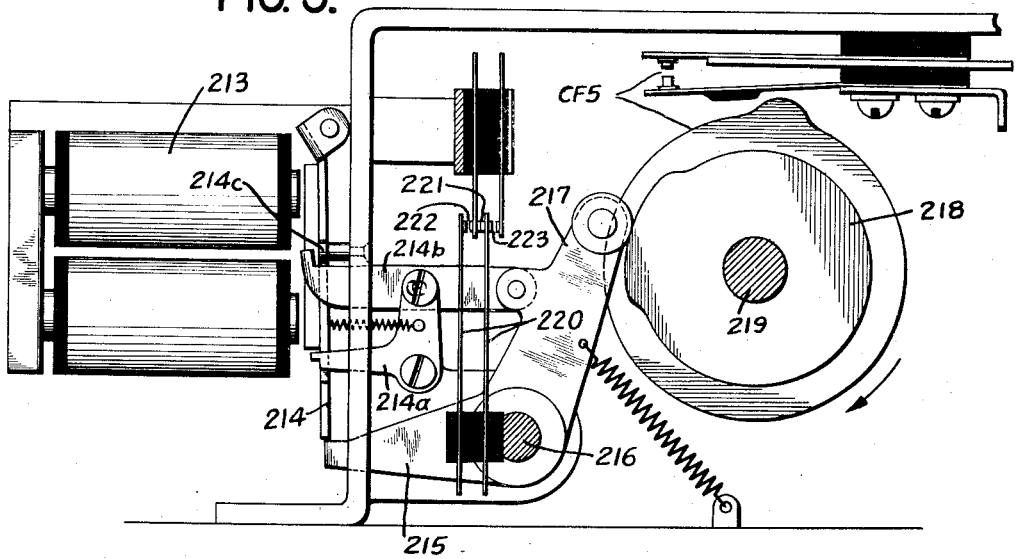
Fig. 9 is a detail of a subtraction contact controlling device.

In Fig. 9 a magnet 213 is shown for controlling the machine when subtracting is to be effected. This is the magnet which is energized when a perforation 2 is found above one of the columns on the card 1 of Fig. 13. When this magnet is energized it will attract its armature 214 releasing an arm 215 fixed on shaft 216 so that an arm 217 also fixed on shaft 216 may be caused by its spring to follow a cam 218 fixed on a shaft 219. Contact blades 220 fixed to the shaft 216 will then be rocked from the position shown to open contacts 221 and close contacts 222, 223. There are several of these sets of contacts as shown in Fig. 18a and their function will be explained presently.

The restoration of the contacts will, of course, be effected by the cam 218 which rocks the follower arm 217 to restore arm 215 where it will again be latched by armature latch 214.

A latch 214a may be provided to hold the armature 214 after it has been attracted and until shaft 216 has rocked. When the shaft rocks the latch 214a will be lifted and a hook 214b will engage a projection 214c on the armature and pull the latter away from the magnet cores to create an air gap so that when the arm 215 is later lowered to its normal position the armature will not be prevented by residual magnetism from moving quickly into position to latch the arm down.

Starting the machine

The wiring diagram of Fig. 18 shows the control of the running of the machine for effecting adding, subtracting and totaling. The control of the machine is more fully disclosed in my aforesaid copending application. Only so much of the control as is necessary to understand the operation of the present device is included in this diagram as the complete control wiring diagram would be so much more complicated that it would not be so readily understood without an unnecessary amount of study.

The source of power is shown as including lines 225, 226. When a switch 227 is closed the motor 228 will operate. When the start key 229 is depressed contacts 230, 231 will be closed. This will close a circuit from the line 225 through conductor 232, contacts 230, wire 233, card feed clutch magnet 234, contacts TS7 normally closed, contacts 231 now closed, stop key contacts 236 normally closed, wire 237, 238, to the line 226. The energization of the card feed magnet 234 will cause cards to be fed through the machine. When the cards engage card lever 239 contacts 240 will be closed and contacts 241 will be opened. The start key 229 may then be released and the circuit will flow from the line 225 through wire 232 to the point 242, then through contacts 240, wire 243, wire 233, card feed magnet 234, contacts TS7, contacts 244 which have now been closed by the card feed clutch, then through stop key contacts 236, wires 237, 238 and back to the line. Between cards the contacts 240 will open. Contacts CB1 are timed to close at this time so that the card feed circuit will pass from the point 242 through contacts CB1 to wire 243 and through magnet 234, etc.

Card feeding will thus continue and the machine will operate to accumulate and to list the amounts being accumulated, if desired, on a listing sheet.

When the machine is set to total the contacts TS7 which are controlled by magnet 186 along with contacts 205 will be opened to prevent restarting of the card feed while totaling.

So far as the present device is concerned we may assume that a single group of cards is placed in the machine and the start key is depressed. Card feeding starts as we have seen. If listing is to be effected the switch S4 is closed. Now when the LCL1 contacts are closed by the cards actuating the same card lever as controls the contacts LCL2, current will pass from line 225 through wire 245, printing clutch magnet M, switch S4, contacts LCL1, contacts 244, 236 and to the line 226. After the cards have all run through the machine card lever contacts LCL1, 240 will open and contacts 241 will close. Magnet 234 will become deenergized and feeding will cease. The printing magnet M will also be deenergized. When the total key is pressed to take a total, contacts TS6 will close to reenergize the printing clutch magnet M so that the total may be printed.

Fig. 18a

Fig. 18a shows a wiring diagram of the accumulating and printing operations of the machine. Numerous circuit closing contacts shown in this diagram are operated by certain parts of the machine depending upon whether the contacts are to be operated during a card feeding cycle or during a totaling cycle of the machine when feeding is not being effected.

The contacts and cams that are operated during the card feeding cycle of the machine when the machine is either adding or subtracting, during which operation listing of the amounts added and subtracted may also be effected, are designated CF cams and contacts. All of the CF cams may be mounted on the shaft 219 of Fig. 1 which shaft is operated when cards are being fed through the machine. Other cams and contacts are designated as CR cams and contacts. These cams are continuously operating whether the machine is adding and subtracting or totaling. These cams may be mounted for operation on shaft 19 (Fig. 2) which shaft is always turning. Certain contacts not operated by cams and designated TS contacts may be normally opened or normally closed and are controlled by the plates 207 of Figs. 7a, 1 and 2. When the machine goes into a totaling operation and the magnet 186 is energized to shift the parts so that the open TS contacts become closed and those that are closed become opened. Certain cams are designated M cams and may be mounted on shaft 134 of Fig. 2. The contacts designated SUB—1 are connected to the shaft 216 (Fig. 9) to be closed when the magnet 213 is energized.

The adding operation

Presuming cards to be feeding through the machine, the cards first pass under the upper brushes 4 and then under the lower brushes 5. While a card is under the brushes 5 the contacts CF—1 are closed by their cam. If a perforation appears in any column on the card when such perforation passes under a brush 5 a circuit will be set up through the perforation as follows: from line 225, through the LCL—2 contacts which are held closed by the cards while cards are feeding, then through contacts CF—1 and through the brush 250 to the common contact 251, then through the perforation in the card to the brush 5 then through a plugging wire 252, to the socket 253, then through the cable 254 to contacts 221 now closed, then through contacts 255 also closed, through magnet 48, wire 256, to the other side of the line 226.

The energization of magnet 48 as we have seen in connection with Figs. 3 and 4 causes the accumulator gear 38 to commence to turn to accumulate. It commences to turn at a point in the cycle when a perforation passes under the brush 5 and ceases to rotate when the cam point 51 causes the gear 30 to become disengaged with gear 29. Thus the amount represented by the position of the perforation is accumulated in the adding gear 38. The circuit through the brush 5 also effects printing through the following circuit: from the plug socket 253, through cable 257 to contacts 205c normally closed, contacts 258 also closed, printing magnet 108, wire 259, through contacts CF—9 which are closed during the card cycle, then to the other side of the line 226. The energization of printing maget 108 is described in connection with Fig. 2 controls the setting of the type carrier 117 to cause printing of the character represented by the position of the hole in the card.

As shown in Figs. 14 and 16 as each item is printed it may be followed by a plus or minus designation indicating whether the data is being added or substracted in the machine. If the card is a plus card, a circuit will be set up from the line 225, through wire 260 to contacts 261 which are controlled by the cam CF—8. At the beginning of a card cycle the contacts 261 and 262 are open. During the cycle the cam first closes contacts 262 but if the contacts SUB—1 are open, nothing happens. Later in the cycle the cam permits contacts 261 to become closed. At this moment the current from wire 260 passes through contacts 261 to binding post 263, through the plugging connection 264, to a magnet 108a. This magnet controls the type bar which carries the type elements for printing the plus or minus sign.

The minus type is so located on the type bar that if when contacts 262 become closed, contacts SUB—1 are closed, a circuit is permitted to pass to energize magnet 108a. The type bar will then be stopped in position to present the minus sign in printing line. If when contacts 262 become closed the contacts SUB—1 are open, then the magnet 108a does not become energized and the type bar continues to rise until the contacts 261 are closed later in the cycle. The magnet 108a will then become energized at this later point in the cycle and will cause the type bar to be stopped at a different position presenting the plus type in printing line to print the plus sign after the amount listed on the listing sheet 168. Carrying from one order on the accumulator to the next higher order is effected as follows: if the accumulator wheel 38 of any order passes from nine to zero during an adding operation it will cause the brush 65 to rock into position to be later engaged by the commutator segment 68 as has been described. After the accumulators have been disengaged the contacts CF—3, CF—4 are closed momentarily. This closure takes place at the moment when the commutator segment 68 is passing the position of brush 65. If the brush has been rocked so as to be engaged by the segment, a circuit will be closed at this moment from the line 225, through contacts CF—3, CF—4, brush 65, commutator segment 68, brush 75, wire 270, cable 254, then through contacts 205c of the next higher order, contacts 255 of such order, corresponding magnet 48, wire 256 and back to the line 226. Thus the accumulator of the next higher order will be actuated after the cam point 51 has cammed the gear 30 out.

As soon as one has been rolled into the wheels, the cam point 52 will cam the gear 30 out again so that the accumulator wheel 38 again stops having received an additional one. If any accumulator wheel is standing at nine when an additional one is added to it, we have seen that its brush 78 will be in position to be engaged by its commutator segment 79. This engagement again takes place during the moment that the contacts CF—3 and CF—4 are closed. Thus when current passes from the brush 75 to wire 270 it will also pass on to brush 78, commutator segment 79 of the next higher order, then to brush 75 of that order and out to the next wire 270 and on to the adding magnet 48 of the order above that to cause one to be added to such order. Thus if the accumulator wheel of the tens order is standing at nine at the end of an accumulating operation and the wheel of the units order passes from nine to zero, one will be carried into the accumulator wheel of the tens order and through the brush 78 of the tens order into the accumulator wheel of the hundreds order and so on.

Subtracting operation

If the card 1 of Fig. 13 is perforated at 2 in one of its columns and the brush 4 which reads this particular column is connected by the plug line 271 to the magnet 213, the device will be set up to add complements of the number contained on the card. Contacts TS9 are closed while the card is passing under the brushes 4. Contacts CF—5 are closed while the brushes are passing the position of the perforation 2. Thus if there is a perforation in this position, brush 4 will make contact with the common contact roller 251a and set up a circuit from the line 225, through contacts CF—5, magnet 213, line 271, brush 4, contact roller 251a, brush 250a, contacts TS9, wire 273 and back to the line 226.

The energization of magnet 213 will as we have seen open the contacts 221 and close the contacts 222, 223. These contacts will remain in their changed position while the card is passing under the lower brushes 5. Contacts CF—6 and CF—7 are closed when the nine position on the card is passing the brushes 5. Thus whether or not there are holes in the nine positions of the columns of the card, all of the accumulator magnets 48 will be energized to throw all of the accumulator wheels into operation. The circuit through magnets 48 is as follows: from the line 225, through wire 274, contacts CF—6, CF—7, contacts 223, now closed, contacts 255 which have not been disturbed, magnet 48, wire 256 and back to the line 226. All of the accumulator wheels will thus commence to rotate as the nine position on the card passes under the brushes 5 and will continue to rotate until the cam point 51 cams the gear 30 out of mesh with gear 29 unless gear 30 is thrown out at an earlier point. If a perforation appears at the nine position in a card, then the gear 30 of that particular column must not commence to rotate even though its magnet 48 has been energized through the contacts CF—6 and CF—7. When the perforation in the nine position passes under its brush 5 it will set up a circuit as follows: from the line 225, through contacts LCL—2, contacts CF—1, brush 250, contact roller 251, the particular brush 5, plug connection 252, plug socket 253, cable 254, the corresponding contacts 222, now closed, magnet 54, wire 256 and back to the line 226. The energization of magnet 54 thus takes place at the same time as the energization of the magnet 48 of the same order.

As described in connection with Figs. 3 and 4, magnet 54 releases the arm 59. This presses the finger 62 and rocks the arm 33 back to normal position so that gear 30 cannot mesh with gear 29. Thus the accumulator wheel 38 of that particular order is not actuated during that card cycle. If a perforation appears at some other position in a column of the card the circuit through the magnet 54 takes place at a correspondingly later period in the card cycle and the corresponding gear 30 is thrown out at this later period after the accumulator wheel 38 has turned. The distance through which the accumulator has turned will represent the complement of the value contained on the card. Thus the amount represented in a card having a perforation 2 will be subtracted from the amount contained in the accumulator by the adding of complements. Carrying from one order to the next higher order while subtracting is the same as while adding. It is necessary, however, while subtracting to ordinarily add an extra one to the units order to care for the well known elusive one. This is effected by carrying one from the accumulator wheel of the highest order whenever that wheel passes from its nine position to its zero position and running this one around to the accumulator wheel of the units order. This is effected as follows:

After the brush 65 of the unit of the highest order has moved to position to be engaged by the commutator segment 68 carry will be effected through brush 75, wire 280, wire 281, cable 254, contacts 221, 255 and adding magnet 48 of the adding wheel of the units or lowest order thus causing this adding wheel to accumulate an additional one.

Also if the accumulator wheel of the highest order is standing at nine, the brush 78 will be in position to engage commutator segment 79 so that if a carry is effected from the next lower order to the highest order current will pass from the brush 75 of such lower order and besides effecting carry in the unit of the highest order, will pass through brush 78 to commutator segment 79, brush 75, wire 280 and so on, to the magnet 48 of the unit of the lowest or units order. In connection with carrying while subtracting, it should be mentioned that the contacts 221, 222, 223 which have been shifted by the subtracting magnet 213 for a subtracting operation are restored by the cam 218 of Fig. 9 after the completion of a normal subtracting operation and just prior to the time of carrying so that the magnets 48 may be energized through contacts 221 in a usual carrying operation. The amount taken from the card and being subtracted is also listed on the strip 168 as in Figs. 14 and 16. The circuit which effects this is from the line 225, contacts LCL—2, CF—1, common brush 250, common contact roll 251, brush 5, plug line 252, plug socket 253, cable 257, contacts 205c, contacts 258, printing magnet 108, wire 259, contact CF—9 and back to the line 226. The energization of the printing magnet 108 effects printing in the usual manner. The character printed is that represented by the position of the hole. The printing of the minus sign after the number is effected through the magnet 108a through the following circuit: from line 225, through wire 260, contacts SUB—1 which are closed when magnet 213 is energized, then through contacts 262 when the cam CF—8 closes these contacts, then through connection 263, wire 264, magnet 108a and back to the other side of the line 226. The contacts 262 are closed at the proper time to energize magnet 108a to stop the type bar in position to place the minus sign in the printing line.

*Totaling operation taking a position total*

To take a total, the total key 282 is depressed closing contacts 283 (Fig. 18). This energizes magnet 186 as soon as the CR—1 contacts are closed. The contacts 205 are then shifted by the mechanism of Fig. 7a. Contacts TS—2 of Fig. 18a are also carried by the mechanism of Fig. 7a and are closed when the magnet 186 is energized. Contacts CR—5 and CR—4 are closed at a definite time after the shifting of contacts 205 and a circuit will be set up from the line 225, through contacts TS—2, contacts CR—4 and CR—5, wire 283, contacts 205a now closed, wire 284, contacts 255, accumulator magnet 48 and back to the line 226. This takes place at a time in the operation of the machine corresponding to one step prior to the time that the nine positions on the card would pass under the brushes 5. The accumulators are then all thrown into mesh for operation and will turn through ten steps or in other words, each wheel will turn to add the value ten unless interrupted at an intermediate point. While the accumulating wheels are thus turning, a circuit is adapted to be closed from the line 225, through contacts TS—3, closed by the device of Fig. 7a, through contacts CR—2 and CR—3, contacts MB—2 which are normally closed, to brush 103. The disk 107 with commutator segments 106 is turning with the accumulator wheels. When the segment 106 reaches a position bridging contacts 103, 102, the circuit will continue through the segment 106 to contact 102, through contacts 205b now closed, contacts 258, magnet 108 and back to the line 226. The energization of the printing magnet 108 will set the respective type bars for printing.

The position at which a type bar is set will correspond to the value contained in the respective accumulator unit so that the type bars will thus print the value contained in the accumulator. The accumulator wheels will be demeshed at the zero position, the grooved bar 114 of Fig. 7a having released the lever 112 to permit the gears 30 to be cammed and latched out so that the accumulators will be cleared and ready for a new accumulating operation.

In other application I disclosed how the number which is taken out of the accumulators may be returned thereto so that after a total has been printed it will still remain in the accumulators and additional data may be added thereto to produce an accumulative total. This is effected by locking the bar 114 against rotation so that the accumulators will not be demeshed at the zero position but will continue to turn until they have turned a distance equal to the value ten and will thus have returned to their starting position. This mechanism, however, forms no part of the present invention and will therefore not be disclosed in greater detail.

To print the plus sign after the total in this instance, the circuit is through the contacts TS—3 now closed, contacts CR—2 and CR—3, wire 285, contacts M—3 which are closed during a portion of each cycle of the machine, wire 286, contacts 287 as soon as they are closed by their cam M—1, then through the plugging line 264 to the magnet 108a.

*Taking a minus total*

If the amount standing in the accumulators is a minus balance, that is if the total of the amount subtracted is greater than the total of the amounts added, the accumulator unit of the highest order will contain the value nine. Thus whenever a total is to be taken, the accumulator unit of the highest order is analyzed for a nine. If it contains a nine, the mechanism is set up to print the complement of the value contained in the accumulator which will be the true difference between the total of the amounts added and the total of the amounts subtracted and will be a minus balance. After the total key has been depressed and the contacts TS—3 closed, current will pass from line 225, through contacts TS—3, wire 288, contacts M—2 which are closed at an early period in the cycle, wire 289, brush 105, contact segment 106 which now bridges contacts 105 and 104, then to contact 104, wire 290, minus balance magnet MB—1, and back to the line 226. This magnet reverses the condition of contacts 255, 258 that is, opens them and closes contacts 292, 293 and also opens contacts MB—2 and closes contacts MB—3. The circuit will now be set up from the line 225, through contacts TS—3 now closed, contacts CR—2 and CR—3, wire 285, contacts M—3, contacts MB—3, brush 92, commutator 89 and commutator segments 90, (see Fig. 3), brush 100, commutator 97 (see also Figs. 4 and 12), brush 99, cable 291, contacts 292 now closed, accumulator magnet 48 and back to the other side of the line 226. This will cause the accumulators to commence to rotate. They will rotate until they reach their zero positions at which time they will be demeshed and left at zero for a new accumulating operation.

The current will also pass from the cable 291, through contacts 293 also closed at this time, then through the printing magnet 108, and back to the other side of the line. The brush 100 passes under the commutator segment 90 at a time depending upon the position of the accumulator wheel which through gears 86 and 87 is causing the segments 90 to turn. The contact takes place at a time corresponding to the complement of the value contained in the particular accumulator. Thus the printing type are set to print the complement. The minus sign will now be printed after the minus balance by a circuit from line 225, through contacts TS—3, contacts CR—2 and CR—3, wire 285, contacts M—3, contacts MB—3 now closed, wire 294, contacts 295 as soon as cam M—1 closes them, then through plugging line 264 to the printing magnet 108a.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

I claim:

1. In an accumulating device, an accumulating pinion, means controlled by said accumulating pinion for controlling the printing of total values represented by the position of the pinion, an electric commutator controlled by said pinion and means controlled by said commutator for printing complements of total values represented by the position of the pinion.

2. In an accounting machine, a plurality of interconnected commutators, total printing mechanism, means controlled by the position of one of said commutators for alternatively causing totals to be printed under control of one of said commutators and for causing complements of the values contained therein to be printed under control of the other commutator.

3. In an accumulating device, a constantly running driving member, an accumulator adapted to be operatively connected to said member, a pair of electric commutators associated with said accumulator, means associated with one of said commutators for reading out true numbers and means associated with the other of said commutators for reading out complements of true numbers.

4. In an accumulating device, a constantly running driving gear, an accumulating gear, a coupling device comprising a pair of pinions for coupling said gears to cause the accumulating gear to operate, an electromagnet adapted to cause said pinions to move into coupling relation with said gears and a second electromagnet adapted to cause said pinions to move out of coupling relation with said gears.

5. In an accumulating device, an accumulating wheel, an electric commutator associated with said wheel, a printing device adapted to be controlled through said commutator, a second commutator controlled by said accumulating gear, and a constantly rotating brush cooperating with said second commutator for also controlling said printing device.

6. In an accounting device, an accumulating member, a plurality of electric commutators associated with said member, a printing unit, means associated with one of said commutators to control said printing unit to print true numbers represented by the position of said member, and means associated with the other of said commutators for printing complements of true numbers represented by the position of said number.

7. In an accounting device, an accumulating member, a plurality of electric commutators associated with said member, a printing unit, means associated with one of said commutators to control said printing unit to print true numbers represented by the position of said member, means associated with the other of said commutators for printing complements of true numbers represented by the position of said number, and means controlled by one of said commutators for determining which commutator shall control the printing unit.

In testimony whereof I hereto affix my signature.

JOHN ROYDEN PEIRCE.